United States Patent [19]

Ackerman

[11] Patent Number: 5,035,471

[45] Date of Patent: Jul. 30, 1991

[54] SAFETY ARRANGEMENT FOR OVERHEAD LUGGAGE BINS IN AIRCRAFT PASSENGER CABINS

[75] Inventor: David Ackerman, Pulham, Nr Dorchester, United Kingdom

[73] Assignee: Bridport Aviation Products Limited, Bridport, England

[21] Appl. No.: 454,851

[22] Filed: Dec. 22, 1989

Related U.S. Application Data

[63] Continuation-in-part of Ser. No. 365,780, Jun. 14, 1989, abandoned.

[30] Foreign Application Priority Data

Jun. 22, 1988 [GB] United Kingdom ............... 8814865

[51] Int. Cl.$^5$ ............................................. A47B 81/00
[52] U.S. Cl. .................................................... 312/291
[58] Field of Search ................ 220/259; 312/291, 326, 312/327, 328; 244/18.1

[56] References Cited

U.S. PATENT DOCUMENTS

| | | | |
|---|---|---|---|
| 1,529,982 | 3/1925 | Bunzli | 312/291 X |
| 1,882,338 | 10/1932 | Reed et al. | 244/118.1 |
| 1,971,637 | 8/1934 | Bellanca | 244/118.1 |
| 2,126,134 | 8/1938 | Palley et al. | 312/291 X |
| 2,127,379 | 8/1938 | Adams | 312/291 |
| 2,457,043 | 12/1948 | Histand | 312/291 |
| 2,494,696 | 1/1950 | Cerny | 244/118.1 |
| 2,676,864 | 4/1954 | Townsend | 312/291 |
| 4,014,329 | 1/1912 | Pons | 312/291 X |
| 4,813,753 | 3/1989 | Relyea | 312/291 |
| 4,907,762 | 3/1990 | Bock et al. | 244/118.7 |

Primary Examiner—Joseph Falk
Attorney, Agent, or Firm—Dennison, Meserole, Pollack & Scheiner

[57] ABSTRACT

The invention relates to overhead luggage bins in the cabins of aircraft, the bin being either pre-existing or equipment to be newly fitted. Such bins have horizontally elongate frontal access openings. The invention provides that behind the main front door panel which closes such an opening there is provided transparent visor means which masks at least the lower part of the access opening while enabling objects within the bin to be seen. An essential feature is that the visor means are constituted by multiple part-visor located side by side, each of which are self latching on closure of the visor means, the part-visors being individually openable on unlocking of the latching means. This arrangement reduces the risk of heavy objects falling from the bin in that it militates against inadvertant simultaneous uncovering by one person, of the whole lateral width and extent of the frontal access opening of the bin.

9 Claims, 7 Drawing Sheets

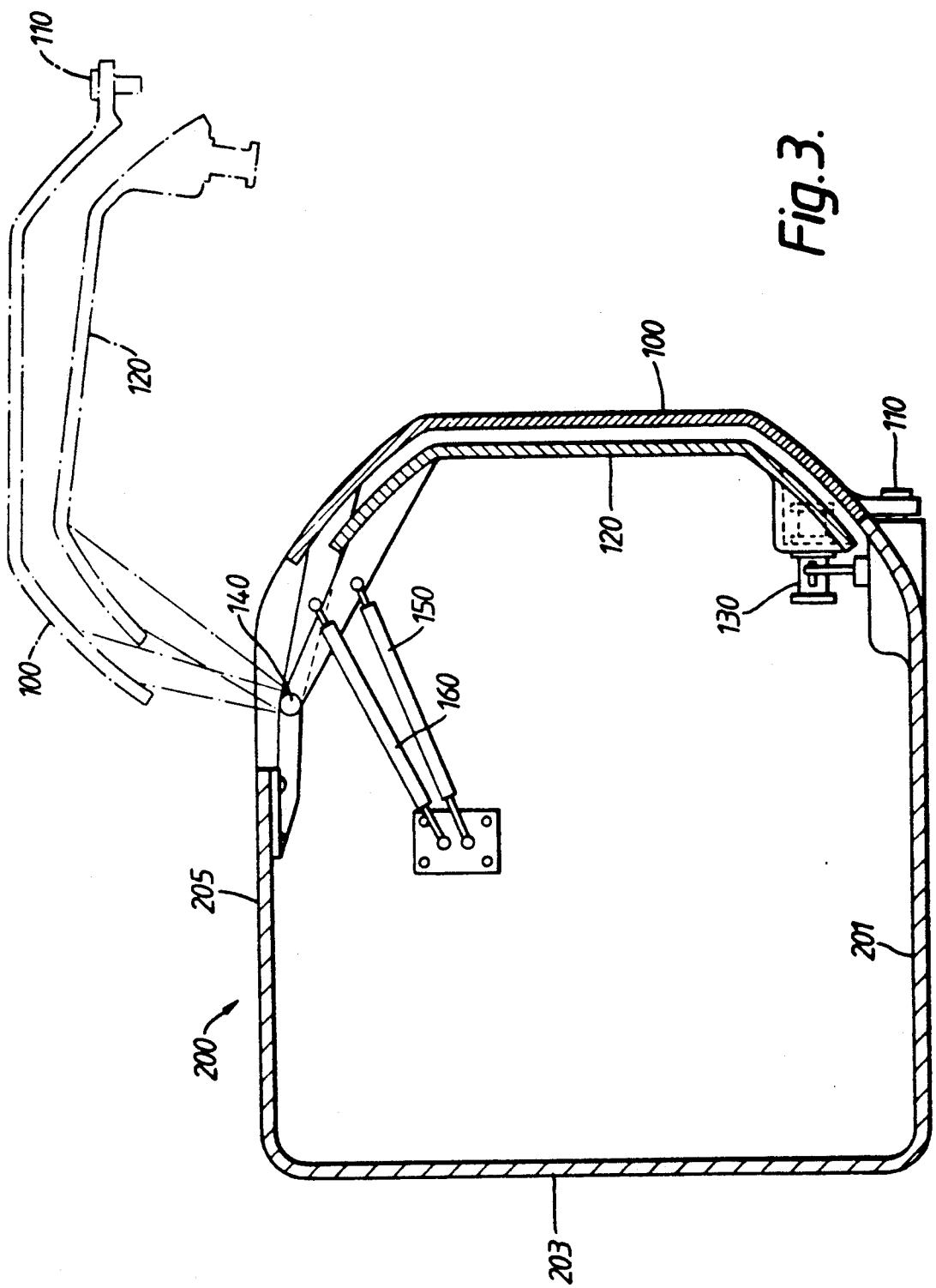

SAFETY ARRANGEMENT FOR OVERHEAD LUGGAGE BINS IN AIRCRAFT PASSENGER CABINS

This is a continuation-in-part of application Ser. No. 365,780 filed Jun. 14, 1989, now abandoned.

BACKGROUND OF THE INVENTION

This invention relates to the provision of a safety arrangement for preventing articles from being accidentally or unintentionally displaced from an overhead bin for hand luggage, that is to be found in the passenger cabin of an aircraft.

An overhead luggage bin in an aircraft cabin is well known; but is shape, the working interrelationships of its elemental parts and its location present certain problems, some of which interact. For example, the bin must be large and strong and yet be light in weight, and it is usually to be constructed of flame or fire resistant materials. Its closure door means should open outwardly and upwardly and the full storage space should be capable of being exposed. The door opens upwardly so that space for movement of passengers and crew within the cabin is not impinged upon.

The actual construction of such overhead bins varies and is adapted to conform with structural requirements and the overall internal configuration of the cabin of the aircraft in which it is installed. In one typical form of such a luggage bin, the bin has such a construction that its interior has the shape of a generally rectangular box. The essential feature of such a bin is its shelf like strongly made floor. From this, side and rear wall panels extend upwardly. These side and rear panels need not extend upwardly over the full height of the luggage space defined within the bin. Such a bin will often, but not always, possess a roof panel. Where there is no roof panel, the roof of the cabin of the aircraft may serve also as the roof of the luggage bin; and in this case, the front door panel which lifts to open, may be hinged at or towards its upper generally horizontal edge to a structural part of the body or structure of the aircraft. Where the bin has a roof panel the main bin door may be hinged to a frontal part of such roof panel; or, alternatively, the upwardly and outwardly opening closure door means may be hinged to side walls of the luggage bin. At least the floor panel and the closure door means when closed, will be firmly attached to, or firmly relative to, the body or structure of the aircraft cabin.

These bins are often up to seven feet wide, and they are usually at least 30 inches wide; and as a result their frontal access openings are corresponding large and wide. Considering a typical overhead bin whose access opening has a height of 20 inches and a width of 60 inches it needs to be mentioned that this bin will be disposed above the cabin seating and the bin floor will be located some 60 inches above the cabin floor. A person operating the catch means of the main bin door to lift this door to open it will have a line of sight extending to the bin opening over a distance of about 20 inches. The field of view will extend over about 30°, and an arc of say 24 inches will be subtended. Thus on opening the main bin door, the person will have a field of view extending over less than half of the full width of the bin opening. The span of a human hand is six to nine inches and this is a small fraction of the full width of the bin opening.

Accordingly, even if the passenger or crew member, who is opening the bin, has both hands free, the full width of the opening can be covered and viewed, only if speed and dexterity of hand and eye are employed. And accordingly, when the front door panel of such a bin is opened by being raised, there is a risk in that heavy articles such as cameras, brief cases or even bottles are liable to fall out inadvertently, and this may cause injury to a passenger seated or standing nearby. A particularly dangerous situation occurs when the bin is fully loaded with a variety of heavy articles. Loading will not have been effected systematically. On the contrary, heavy objects will be randomly located and may have been inserted on top of other objects; and they may be liable to slide and fall out as soon as the main closure door of the bin is opened.

SUMMARY OF THE INVENTION

The invention is concerned with the provision of improved utility and safety in an overhead luggage bin of the type which has an opening whose width is greater than say 80 centimeters or about 31 inches. Typically the frontal openings of such bins have heights of 50 cm, or about 20 inches, or more and they may have widths of 50 to 70 inches. This frontal access opening will be closable by a single primary bin door with its own "slam shut" latching means located at its lower edge and this main door will open outwardly and upwardly and it will be spring assisted during its opening movement.

According to this invention, in its broadest aspect, there is provided an aircraft cabin luggage bin having wall panel means fixed to structure of the aircraft cabin and defining a load carrying interior having the general shape of a box; said box having a laterally elongate frontal access opening and a front door panel which is openable to uncover, and closable to cover, said opening; said door panel having an upper generally horizontal edge and being hinged at a location adjacent its said upper edge; and in which said front door panel lifts, on opening to uncover said frontal access opening of the bin, pivoting outwardly and upwardly about its hinge; and said luggage bin being characterized in that there is provided behind the upwardly and outwardly pivoting front door panel of such a bin, visor means comprising a plurality of hinged, upwardly and outwardly pivoting transparent visors, each of which has catch means which require to be released before the visor can be raised: said visor means constituting a temporary physical barrier, which masks at least the lower half of the access opening which is uncovered when the front closure door panel of the bin is opened.

The invention is based upon the appreciation that utility and safety will be promoted if the following considerations can be satisfied, in the circumstances when, the bin is full of articles, and the main bin door is opened. Firstly, it will assist if there remains some temporary physical barrier to prevent objects from falling out. Secondly, it will assist if it is possible to view at least the uppermost article disposed behind the temporary physical barrier, and also, it will assist if the means constituting the temporary physical barrier, are removable, but not all at once by one hand. The provision of multiple, separately movable and separately latchable transparent visor means meets these requirements and will be helpful in preventing accidents. If these visor means nest neatly behind the main bin doors, both when opened and when closed, the loss of usable space is minimised.

The invention is particularly applicable to bins with wide front openings, that is those whose width is greater than say 40 inches. Accordingly, in a preferred embodiment of this invention there is provided an aircraft cabin luggage bin defining a load carrying interior having the general shape of a box and with a front door panel which lifts to open to uncover a frontal access opening of the bin, the front panel being hinged at a location adjacent its upper generally horizontal edge, and characterized in that there is provided behind the upwardly and outwardly pivoting front door panel of such a bin, auxiliary visor means which has the following characteristics in combination.

a) said visor means is constituted by a plurality of hinged part-visors located side by side to extend over substantially the full width of the opening uncovered by the lift-up front door panel of the bin, said part-visors being openable and closable separately of one another and said part visors pivoting upwardly and outwardly to open;
  b) each part-visor has catch means which require to be released by hand, before the visor can be raised, each said catch means being self-latching when the visor is closing;
  c) each part-visor is formed, over the major part of its area, of material which is transparent and enables objects stowed away behind each said part-visor to be seen; and
  d) and each said part-visor is assisted by spring means during its upward and outward movement towards its fully open position.

Such a multi-visor system is well suited to one handed operation, both in opening and closing. When opening, one hand is used first to open the main door of the bin; then to operate the release catch; then to raise on part-visor assisted by the spring means. The other hand is free to prevent objects from falling out. At first other part-visors which extend over the remainder of the width of the bin opening, are latched shut to prevent other objects falling out. When closing the bin, each part visor may be closed in turn to pen objects in sections of the bin. Or the main door of the bin may be shut and this will also effect closure and latching of all the auxiliary part-visors.

Visor widths will be within the range 15 to 32 inches and preferably within the range 24 to 30 inches. It is not necessary for each visor to mask the full height of each bin opening—for example, the height of each part-visor in its mid region may be some 14 inches, while the height of bin opening might be 20 inches. What is necessary is that the visor means, when latched closed, must mask at least the lower half of each bin opening. Any gap unmasked by the visor means in the upper part of each bin opening, has a number of possible functions. Thus weight may be saved. Or, clearance room may be provided so that the visor will open past an obstruction, such as for example, to enable the visor as it opens, to clear the frontal edge of the bin roof.

The visors may be hinged close to the hinge axes of the main bin doors. In bins for some aircraft the two hinge systems may pivot aligned axes. But an important preferred feature is that each part visor nests with the main door in both open and closed conditions.

In one particular application, use is made of an existing fixture, this being the casing for the main door hinges. Alternatively, separate new bracket work may be provided and fixed to existing structure on a bin or on some other wall component (of the aircraft cabin) to support the hinges of each part visor.

Different arrangements may be required for bins with unusual configurations. Each bin will always have a bottom and sides, but it will not necessarily have side and back walls of full height, nor a top or roof wall of a full depth; indeed there may be no roof panel. However there will usually be some sort of framework bridging the top of the main door opening of each bin, and the auxiliary visor means provided according to this invention may be hinged to this; or if the bin has side walls, these may be used to mount the hinges of the part visors.

It is essential that each part-visor has its own "slam shut" self-latching catch which must be deliberately manipulated if the visor is to be opened, for example, by squeezing with finger and thumb or by turning. Preferably slam shutting of the main door also effects slam shutting and self-latching of the visor doors (at least if the bin is empty, or, when partly full, if there is no hindrance to the closing of the visors).

Advantageously each part-visor is comprised of a generally rectangular frame of lightweight composition plastics material resistant to combustion, this frame defining "see-through" openings, and with transparency of the part-visor being achieved by means of reticulated or net-like material which covers said openings.

In one preferred aspect of the invention there is provided an overhead storage bin for aircraft comprising a generally rectangular box-like body including interconnected floor, side and rear walls adapted to be mounted within the cabin of an aircraft to receive and retain passenger articles therewithin, said body defining a laterally elongate generally rectangular, access opening; closure means for said frontal access opening of said bin including a primary front door panel pivotally mounted on a generally horizontal axis for pivotal movement from a generally vertical closed position, outwardly and upwardly to a generally horizontal open position; and said closure means further including generally transparent visor means hingedly mounted to pivot about an axis which is parallel and close to the pivot axis of said primary door panel, said visor means providing visual access to the interior of said bin when said primary door panel is in the open position; said visor means being movable between open and closed positions to provide and deny physical access to the interior of said bin, and retention means on each of said bin and said closure means for cooperatively retaining said closure means in the closed position; and wherein said visor means is constituted by a plurality of hinged part-visors located side by side to extend over substantially the full width of the opening uncovered by the lift-up front door panel of the bin, said part-visors being openable and closable separately of one another and said part visors pivoting upwardly and outwardly to open.

Although a luggage bin provided with such auxiliary visor means may be part of original equipment in an aircraft, this invention is particularly concerned with the provision of such auxiliary visor means capable of and suitable for being fitted to an existing luggage bin fitted in the cabin of an aircraft, for the purpose of improving the utility and safety thereof.

Accordingly, in another preferred aspect of this invention, there is provided for use in conjunction with a previously installed aircraft overhead storage bin, said bin including a generally rectangular box-like body and a pivotally mounted access door which lifts to open, the combination comprising generally transparent visor means hingedly affixed to said storage bin and movable about said hinge between open and closed positions, said visor means being positioned internally of said bin adjacent said access door and configured to complement the interior shape of said door when said door and said visor are in each of the open and closed positions; each of said door and visor means including independent latching means operable to retain said door and said visor means in closed position; and wherein said visor means is constituted by a plurality of hinged part-visors located side by side to extend over substantially the full width of the opening uncovered by the lift-up front door panel of the bin, said part-visors being openable and closable separately of one another and said part visors pivoting upwardly and outwardly to open.

Preferably, there are included also, means associated with each of said door and said visor, to retain each of them in an open position in generally complementary association whereby, when both said door and said visor are in the open position, they may be simultaneously moved to the closed and latched position in a single action by the closure of the door.

BRIEF DESCRIPTION OF THE DRAWINGS

The invention will be described by way of example with reference to the accompanying diagrammatic drawings in which

FIG. 3 is cross-sectional side view showing schematically the opening and closing movements of frontal access opening closure means for a luggage bin according to a further exemplary embodiment.

FIG. 6 being a cross sectional plan view taken on the line VI—VI of FIG. 7; and FIG. 7 being A cross sectional side view taken on the line VII—VII of FIG. 6.

DETAILED DESCRIPTION OF THE PREFERRED EMBODIMENT

Figure 1A:
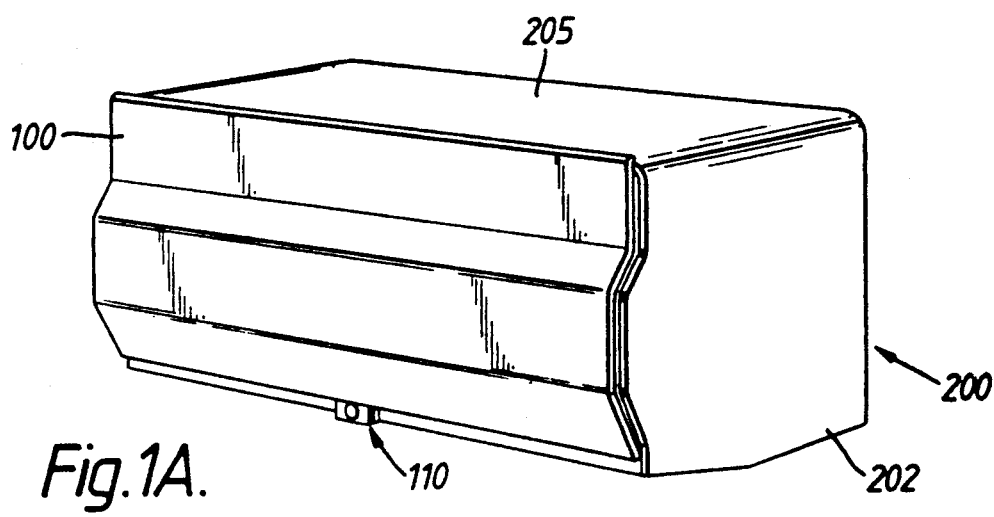
FIGS. 1A, 1B and 1C show a luggage bin of the kind being discussed, in three different operative conditions.
Figure 1B:
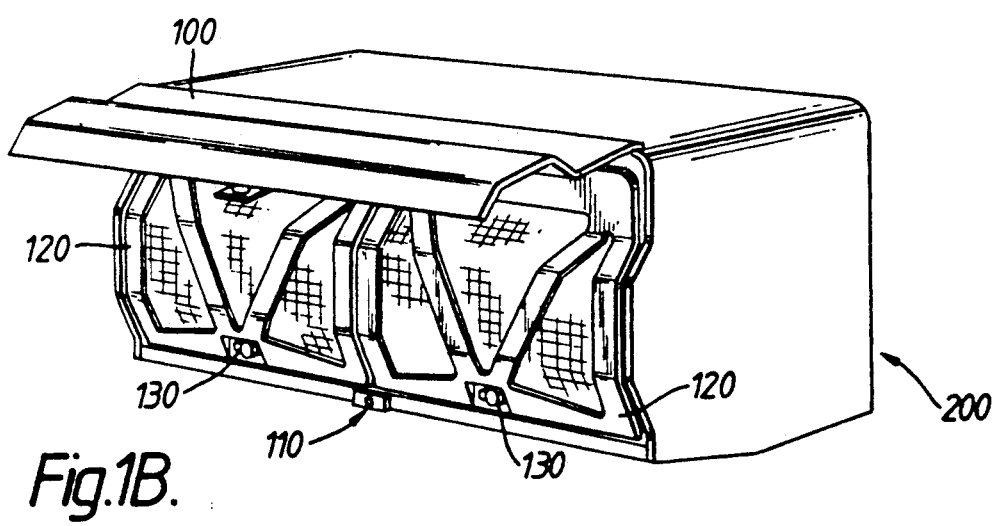
Figure 1C:
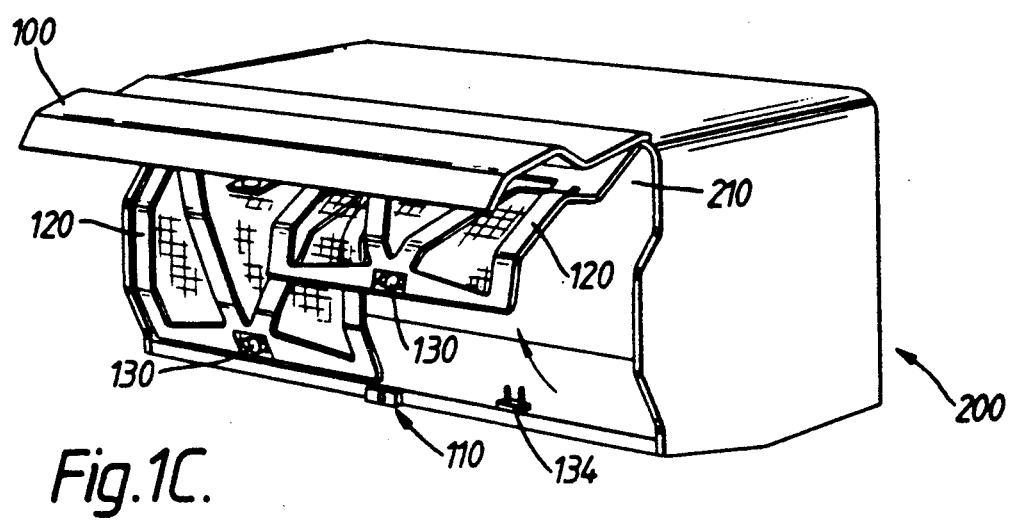
Figure 2:
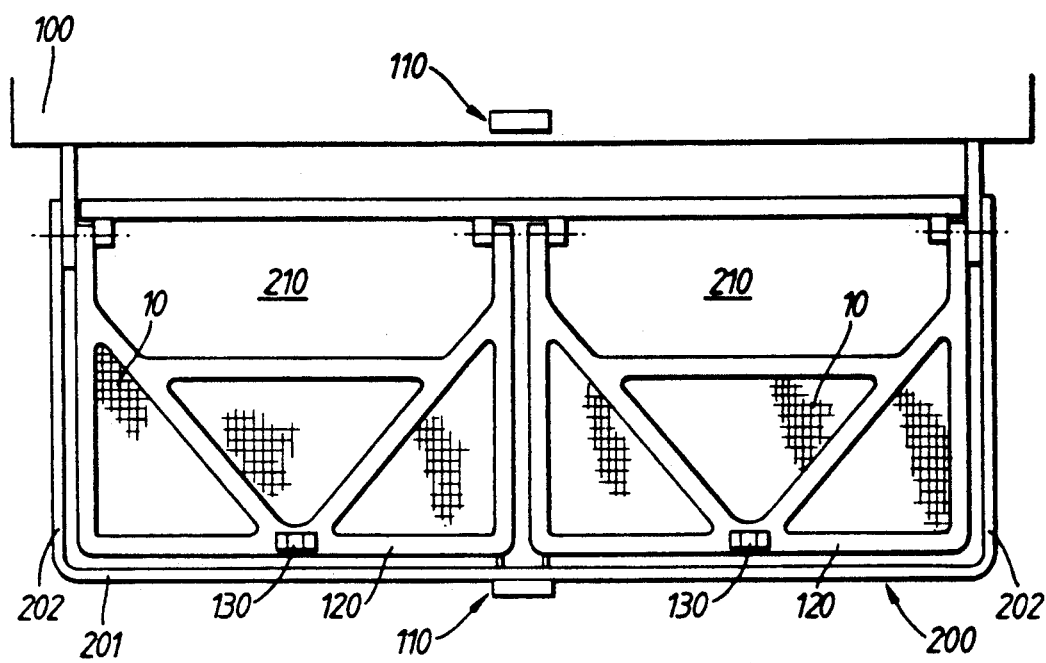
FIG. 2 is a frontal view of a luggage bin in the condition when its main door has been fully opened.

In FIGS. 1 to 3, there is shown a luggage bin generally designated 200 which will be fixed in an overhead location for example above seating in an aircraft cabin. The actual construction of such an overhead bin varies and is adapted to conform with structural requirements and the overall internal configuration of the cabin of the aircraft in which it is installed. In the typical form of such a luggage bin 200 as illustrated diagrammatically, the bin has such a construction that its interior has the shape of a generally rectangular box with a frontal access opening 210 closable by a single main front door 100.

The essential feature of such a bin is its shelf like strongly made floor 201 from which extend upwardly, side panels 202 and a rear panel 203. These side and rear panels need extend upwardly over the full height of the luggage space defined within the bin, but in the case with the bin shown in FIG. 3 of the drawings, these side and rear panels are shown extending to full extent. Such a bin will often, but not always posses a roof panel. Such a roof panel is indicated at 205 in FIGS. 1 to 3. Where there is no roof panel, the roof of the cabin of the aircraft may serve also as the roof of the luggage bin; and in this case, the front door panel 100, which lifts to open, may be hinged at or towards its upper generally horizontal edge to a structural part of the body or structure of aircraft. Where the bin has a roof panel such as indicated at 205, the main bin door 100 may be hinged to a frontal part of such roof panel as shown in FIG. 3; or, alternatively, and as shown in FIG. 2, the upwardly and outwardly opening main closure door 100 may be hinged to side panel means of the luggage bin. At least the floor panel and the closure door means when closed, will be firmly attached to, or firmly relative to, the body or structure of the aircraft cabin.

These bins are often up to seven feet wide, and they are usually at least 30 inches wide; and as a result their frontal access openings 210 are correspondingly large and wide. Considering a typical overhead bin whose access opening has a height of 20 inches and a width of 60 inches it needs to be mentioned that this bin will be disposed above the cabin seating and the bin floor 201 will be located some 60 inches above the cabin floor.

A person operating the catch means (generally designated 110 in FIGS. 1 to 3) of the main bin door 100 to lift this door to open it will have a line of sight extending to the bin opening over a distance of about 20 inches. The field of view will extend over about 30°, and an arc of say 24 inches will be subtended. Thus on opening the main bin door, the person will have a field of view extending over less than half of the full width of the bin opening. The span of human hand is six to nine inches and this is small fraction of the full width of the bin opening.

Accordingly, even if the passenger or crew member, who is opening the bin, has both hands free, the full width of the opening 210 can be covered and viewed, only if speed and dexterity of hand and eye are employed. And accordingly, when the front door panel 100 of such a bin is opened by being raised, there is a risk in that heavy articles such as cameras, brief cases or even bottles are liable to fall out inadvertently, and this may cause injury to a passenger seated or standing nearby. A particularly dangerous situation occurs when the bin is fully loaded with a variety of heavy articles. Loading will not have been effected systematically. On the contrary, heavy objects will be randomly located and may have been inserted on top of other objects; and they may be liable to slide and fall out as soon as the main closure door of the bin is opened.

The invention is concerned with the provision of improved utility and safety in an overhead luggage bin of the type which has an opening 210 whose width is greater than say 80 centimeters or about 31 inches. Typically the frontal openings 210 of such bins 200 have heights of 50 cm, or about 20 inches, or more and they may have widths of 50 to 70 inches. This frontal access opening 210 will be closable by a single primary bin door 100 with its own "slam shut" self-latching means 100 located at its lower edge and engaging cooperating "keep" means affixed to the bin floor 201, and this main door 100 will open outwardly and upwardly and it will be spring assisted during its opening movement.

According to this invention, in one of its broadest aspects, there is provided behind the upwardly and outwardly pivoting front door panel 100 of such a bin 200, a plurality of upwardly and outwardly pivoting transparent visor means generally designated 120 in FIGS. 1 to 3, each of which has catch means generally designated 130, which require to be released before the visor means can be raised, said visor means 120 constituting a temporary physical barrier making at least the lower half of the bin opening 210 which is uncovered when the main bin closure door 100 is opened. Transparency may be achieved by rendering a major part of the visor means of reticulated or net-like material 10.

The invention is based upon the appreciation that utility and safety will be promoted if the following considerations can be satisfied, in the circumstances when, the bin is full of articles, and the main bin door is opened. Firstly, it will assist if there remains some temporary physical barrier to prevent objects from falling out. Secondly, it will assist if it possible to view at least the uppermost article disposed behind the temporary physical barrier, and also, it will assist if the means constituting the temporary physical barrier, are easily removable, but not all at once by one hand. The provision of multiple, separately movable and separately latchable transparent visor means meets these requirements and will be helpful in presenting accidents. If these visor means nest neatly behind the main bin doors, both when opened and when closed, the loss of usable space is minimised.

The invention is particularly applicable to bins with wide front openings, that is those whose width is greater than say 40 inches. Accordingly, and as shown in particular in FIG. 2, the visor means is constituted by a plurality of hinged part-visors located side by side to extend over substantially the full width of the opening 210 uncovered by the lift-up front main door panel 100 of the bin, said part-visors being openable and closable separately of one another and said part visors pivoting upwardly and outwardly to open. Each part-visor has catch means 130 which require to be released by hand, before the visor can be raised, each said catch means is self-latching when the visor is closing.

Each part-visor is formed, over the major part of its area, of net like material 10 which is transparent and enables objects stowed away behind each said part-visor to be seen. And each part-visor is assisted by spring means during its upward and outward movement towards its fully open position, such spring means being indicated diagrammatically at 150 in FIG. 3. In this drawing 160 generally designates further spring means arranged to assist the upward and outward opening movement of the main door panel 100.

Figure 4:
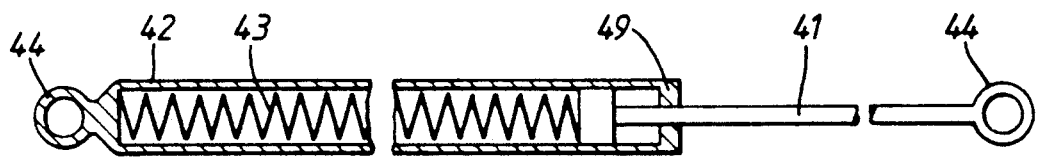
FIGS. 4 and 5 show examples of door helper spring mechanisms.
Figure 5:
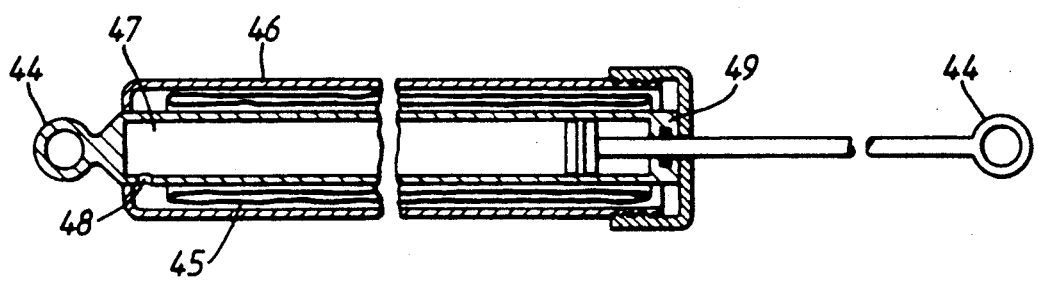

For the spring means 150 or 160, resilient extensible telescopic struts, examples of which are shown in FIGS. 4 and 5 may be employed.

Such a multi-visor system is well suited to one handed operation, both in opening and closing. When opening, one hand is used first to open the main door 100 of the bin; then to operate the release catch 130 of the visor means; then to raise one part-visor assisted by the spring means 150. The other hand is free to prevent objects from falling out. At first, any other part-visors which extend over the remainder of the width of the bin opening, are latched shut to prevent other objects falling out. When closing the bin, each part visor may be closed in turn to pen objects in sections of the bin. Or the main door 100 of the bin may be shut and this will also effect closure and latching of all the auxiliary part-visors.

Visor widths will be within the range 15 to 32 inches and preferably within the range 24 to 30 inches. As shown in FIG. 2, it is not necessary for each visor to mask the full height of each bin opening—for example, the height of each part-visor, in its mid region may be some 14 inches, while the height of bin opening might be 20 inches. What is necessary is that the auxiliary visor means, when latched closed, must mask at least the lower half off the each bin opening. Any gap unmasked by the visor means in the upper part of each pin opening, has a number of possible functions. Thus weight may be saved. Or, clearance room may be provided so that the visor will open past an obstruction, such as for example, to enable the visor as it opens, to clear the frontal edge of the bin roof.

As is shown in FIG. 3, the visors may be hinged at or close to the hinge axes of the main bin door, in FIG. 3 there is a common pivot axis indicated at 140. In bins for some aircraft the two hinges systems may pivot about aligned axes.

But an important preferred feature is that each visor nest with the main door in both open nd closed conditions. Thus, the visors are advantageously so shaped that the configuration of their external surfaces compliments the configuration of the internal surface of the main door 100, as is shown in FIGS. 1 and 3.

Each visor or part-visor preferably comprises a generally rectangular frame of light-weight composite plastics material resistant to combustion. This frame defines "see-through" openings, occupied by a transparent material such as netting which is also of material resistant to combustion. Polypropylene may be employed as the transparent netting.

It will be noted from FIGS. 1B and 1C, that when the front door panel 100 of the bin is opened, the two part-visors remain closed side by side at first. In this condition the contents of the bin can be seen through the net like areas of the visors. Each part-visor can only be raised and opened following a deliberate unlatching of its catch 130. The visor is closed, with its catch 130 being self-latching to become engaged behind a keep 134 in the bin floor 201, and such closing of the visor may be effected by fully lowering the bin door panel 100.

Referring to FIG. 4 there is shown here a resilient extensible telescopic strut (which may serve as the spring means 150 or 160 of FIG. 3), with a piston rod 41 slidable within the cylinder 42 and moving against the resistance of a coil spring 43. The strut has fixing eyes 44 at its opposite ends.

The resilient extensible telescopic strut of FIG. 5 is broadly the same except that the coil spring is replaced by a bag 45 containing a gas under pressure housed within an outer casing 46. Oil 47 transmits forces between the gas bag 45 and the piston rod 41 (moving in cylinder 42) by way of a transfer port 48. 49 denotes an end cap which together with appropriate seals, retains the oil and guides the piston rod.

Figure 6:
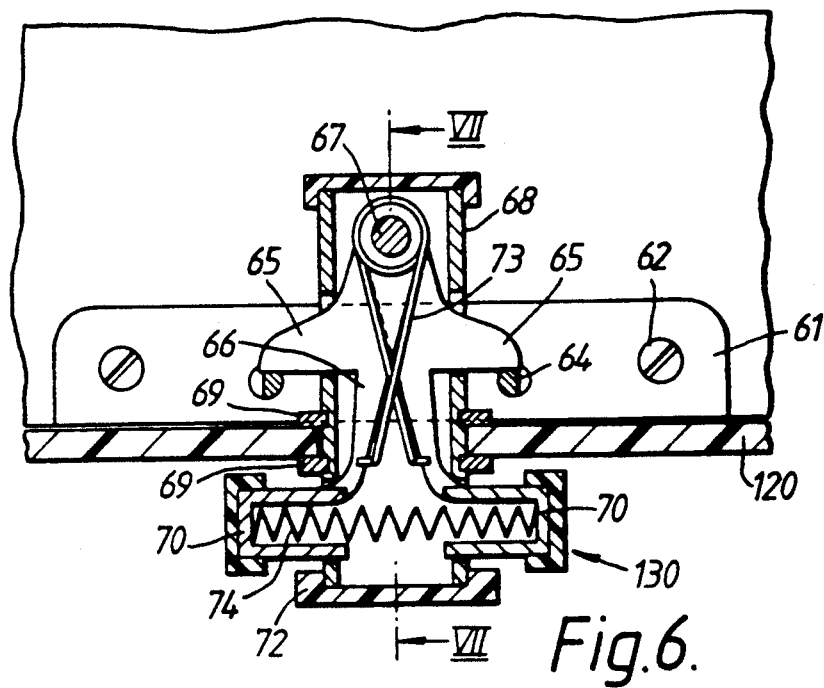
FIGS. 6 and 7 show one example of a "slam shut" door latching mechanism.
Figure 7:
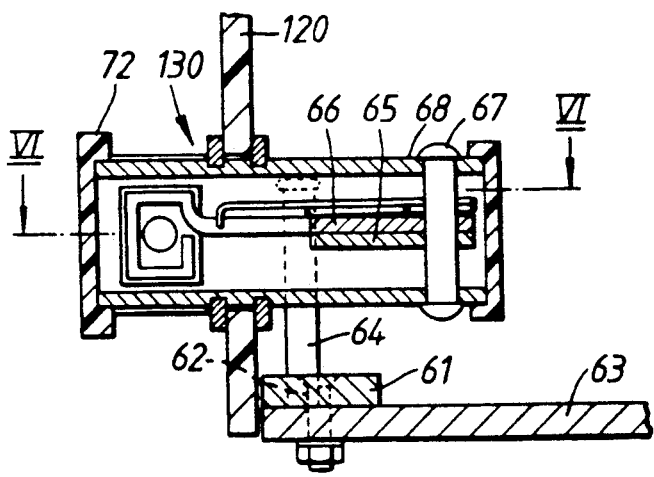

The lock and keep shown diagrammatically in FIGS. 6 and 7, comprises firstly a latch plate 61 secured by screws 62 to a floor panel 63 of a luggage bin. Upstanding from plate 61 are two keep posts 64. 120 represents a visor, which adjacent to its lower edge is fitted with manually operable latching means as generally designated 130 in FIG. 1.

Figure 8:
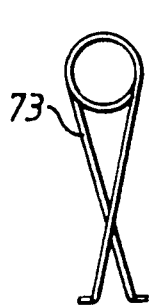
FIG. 8 shows a hairpin spring.
Figure 9:
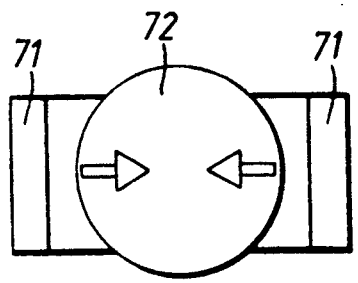
FIG. 9 is a frontal view of a latch release mechanism operable by finger and thumb.

The latch 130 has two locking pawls 65 which engage behind the keep posts 64 in the latched condition, the pawls being carried on scissor arms 66 pivoted on a post 67 fixed in a lock barrel 68. The barrel 68 extends through an aperture in the visor and is secured by circlips 69 in this location. The barrel houses the arms 66 and has slots to accommodate the pawls 65, and it has further apertures to accommodate protruding end cups 70, one on each of the arms 66. The cups 70 have covers 71, shown also in FIG. 9 where there is also shown a cap 72 for the outer end of the lock barrel 68. The covers 71 are squeezable by finger and thumb to close the scissor arms 66 to disengage the pawls 65 from latching engagement with posts 64. A hairpin spring 73, shown also in FIG. 8, surrounds pivot posts 67 and urges apart arms 66. A coil spring 74, supplementing the spring 73, extends between the two cups 70.

When the visor 120 is slammed shut the latching pawls 65 are shaped to ride over the keep posts 64, with the scissor arms 66 closing against the bias of the springs 73 and 74. As soon as the pawls 65 pass behind the keep posts, the scissor arms 66, biased by the springs, diverge and the pawls "self-latch" behind the keep posts, from which they can then only be disengaged by deliberate manipulation, the covers 71 requiring finger and thumb pressure.

Other types of known latching means can be employed, the version shown in FIGS. 6 to 9 being purely by way of example. For example a turn and pull mechanism, similar to that of a household door lock can be employed if it will self latch when pushed shut.

Figure 10:
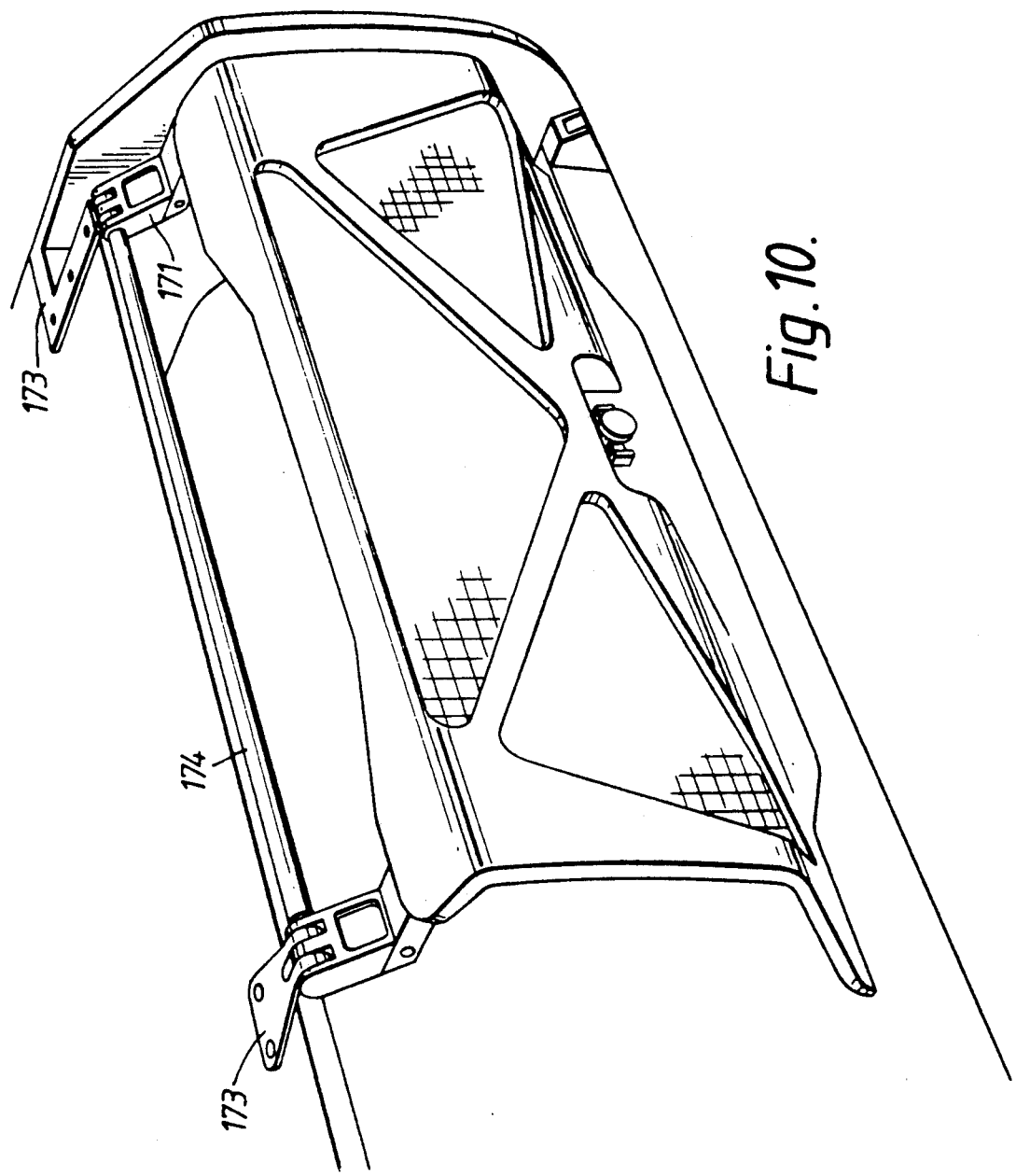
FIG. 10 is a perspective view of a visor means according to the invention fitted to an existing luggage bin.
Figure 11:
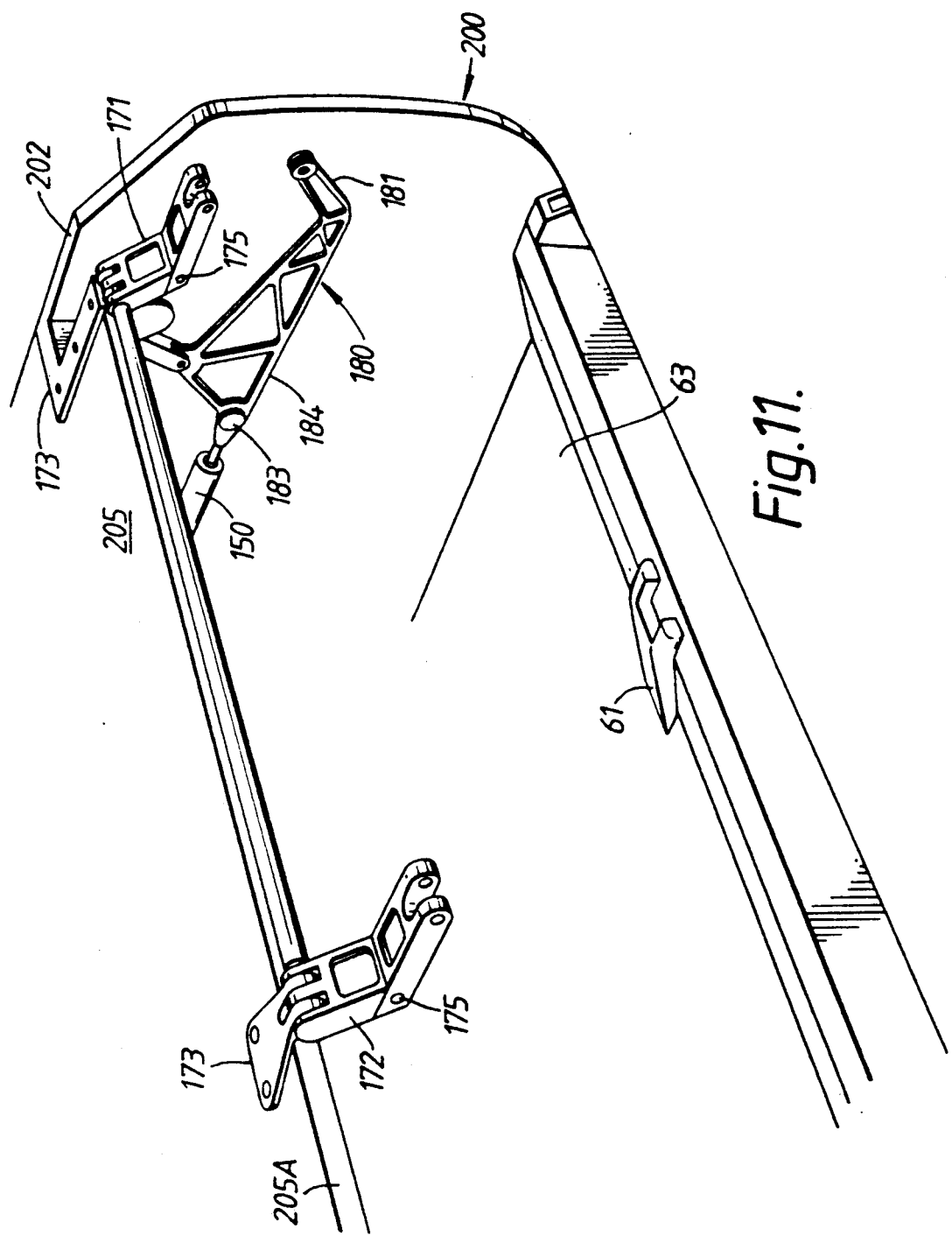
FIG. 11 is a perspective view showing hinge work for the visor of FIG. 10.
Figure 12:
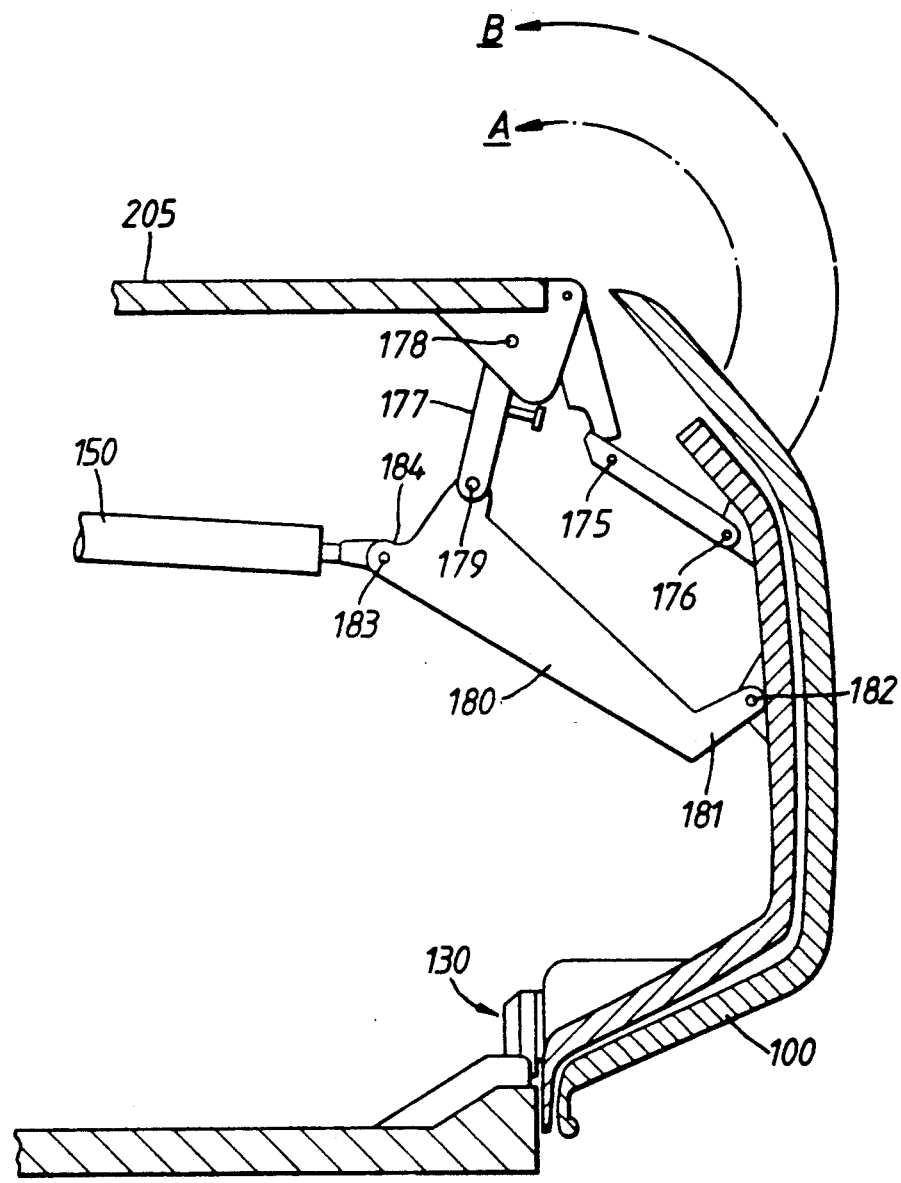
FIG. 12 is a side view of part of the hinge work shown in FIG. 11.

Referring now to FIGS. 10 to 12, the visor 120 there shown, is one of a pair of visors fitted to a bin 200, which exists prefitted by means not shown, to structure defining an aircraft cabin. This bin 200 will have the outwardly and upwardly opening main door 100 shown in FIG. 12. The main door 100 of FIG. 12 is hingedly connected by brackets and pivots not shown, either to the roof panel 205 or to the slide panel 202 of the bin, and the main door is arranged to pivot upwardly to clear the frontal edge 205A of the roof panel 205 as it rises, and then the upper region of the main door panel will move through a path such as that indicated at B in FIG. 12 until it is disposed in rear of the frontal edge 205A of roof panel 205. In this condition the door 100 will be fully open nd disposed generally horizontally; whereas it its closed positions it will be disposed generally vertically; this being the position shown in FIG. 12.

The visor 120, is carried by an outer carrier linkage 171 and an inner carrier linkage 172. At their ends the linkages 171 and 172 are pivotally connected to plates 173 bolted to the bin roof panel 205, and a torque tube 174 interconnects the inner ends of the linkages. Each linkage 171 and 172 comprises two links pivotally connected together by pivot pins 175. At their outer ends the linkages are connected to the visor 120 by hinge pivots 176.

Also hingedly carried on the outer bracket 173 is a link 177 which depends from a pivot pin 178. Carried at the distal end of link 177, by means of pivot pin 179 is a fulcrum arm 180 which has an outer arm portion 181 connected to the visor 120 by a pivot pin 182. A telescopically extensible spring strut 150 acts by pivot pin 183 on a short arm 184 of the fulcrum 180, the opposite end of the strut being pivotally anchored to the bin side wall 202 by means not shown. The strut is spring biased to extend telescopically as is the strut of FIG. 5.

130 again represents latching means for the visor and these will be operative to engage a keep plate 61 secured to the floor panel 63 of the bin 200, the mechanisms being analogous to those described and shown with reference to FIGS. 6 to 9.

As is shown in FIG. 11, the inner and outer linkages 171 and 172, with their hinge plates 173, the arm 180, the strut 150 and the keep plate 61 can all be affixed to the bin, prior to the visor 120 being installed (by pivotally connecting it by pins 176 and 182). Thus the visor is installable in an existing luggage bin already fitted in an aircraft cabin.

It will be noted that the external shape of visor 120 conforms closely to the internal shape of the main door 100, as shown in FIG. 12. This is what is termed "nesting" in this description. The linkage supporting the visor is such that when the visor open it follows a path, such as that indicated at A in FIG. 12, and when fully open it will still be nested with the main door 100.

When the main door is closed by being pulled down, it takes the visor 120 with it, against the bias of the spring strut 150, until the latch 130 self engages the keep plate 61 to hold the visor 120 in closed condition. The torque tube 174 ensures that the inner and outer linkages 171 and 172 operate in harmony.

I claim:

1. An aircraft cabin luggage bin having wall panel means fixed to the structure of the aircraft cabin and defining a load carrying interior with a floor and having the general shape of a box; said box having a laterally elongate frontal access opening and a front door panel which is openable to uncover, and closable to cover, said opening; said door panel having an upper generally horizontal edge and being hinged at a location adjacent its said upper edge to said bin, and on which said front door panel pivots outwardly and upwardly, on opening to uncover said frontal access opening of the bin; said door having a generally horizontal lower edge adjacent said luggage bin floor along a sill defining the lower boundary of said frontal access opening of said bin; and said door having positive self-latching catch means located at its said lower edge which, when said door is in closed position, lockingly engages with positive keep means affixed to said bin adjacent said sill; said luggage bin being further characterized by the following features all in combination;
   a) visor means behind the upwardly and outwardly pivoting front door panel of said bin; said visor means constituting a temporary physical barrier, which when closed, masks at least the lower half of the access opening which is uncovered when the front closure door panel of the bin is opened;
   b) said visor means being pivotally connected to said bin and including a plurality of hinged upwardly and outwardly pivoting transparent part-visors, each of which has independent visor catch means which are required individually to be released before the part-visor can be raised;
   c) each of said part-visors having a generally horizontal lower edge cooperating with said luggage bin sill, defining the lower boundary of said frontal access opening of said bin;
   d) said visor catch means being located at said lower edge of each said part-visor and having a movable latching member which, when said part-visor is in closed position, lockingly engages with a visor keep means affixed to said bin adjacent said sill;

e) each said visor catch means being self-latching when said part-visor is closing; and each said visor catch means requiring operation by hand to unlatch by releasing said movable latching member from locking engagement with said visor keep means affixed adjacent to said bin sill, before the part-visor can be moved from closed position towards its open position.

f) and wherein said self-latching catch means on said front door panel and on each of said part-visors, respectively, together with their respective associated keep means, are all operatively independent on one another, at least during unlatching.

2. A bin according to claim 1 and including spring means arranged and adapted to assist each said visor during its outward and upward pivotal movement towards a full open condition.

3. A bin according to claim 1 and in which when closed said front door panel and said visor means are disposed generally vertically while when open, said front door panel and said visor means are disposed generally horizontally.

4. A bin according to claim 1 in which each part-visor is comprised of a generally rectangular frame of lightweight composite plastics material resistant to combustion, this frame defining "see-through" openings, and with transparency of the part-visor being achieved by means of reticulated or net-like material which covers said openings.

5. A bin according to claim 1 and in which each part-visor is hinged about an axis which is parallel and located close to the hinge axis of the main front door panel.

6. A bin according to claim 1 and in which each part-visor and the bin door panel are both pivotal about a common axis.

7. A bin according to claim 1 and in which at least one gas spring is arranged to assist upward opening movement of each part-visor.

8. A bin according to claim 1 and in which each part-visor has an external shape adapted to conform with the internal shape of the adjacent part of the panel constituting the main bin door, said part-visor nesting with said main door, both in the fully open and in the fully closed conditions of said door.

9. A bin according to claim 1 and in which the visor is hinged to the roof of the bin.

* * * * *